United States Patent
Dohrn (10) Patent No.: US 12,013,871 B2
(45) Date of Patent: Jun. 18, 2024

(54) APPARATUS AND METHOD FOR TRANSFORMING DATA STRUCTURES

(71) Applicant: Hammel Companies Inc., Pittsburgh, PA (US)

(72) Inventor: Joseph Charles Dohrn, Woodland Park, CO (US)

( * ) Notice: Subject to any disclaimer, the term of this patent is extended or adjusted under 35 U.S.C. 154(b) by 0 days.

(21) Appl. No.: 17/976,381

(22) Filed: Oct. 28, 2022

(65) Prior Publication Data
US 2024/0143615 A1    May 2, 2024

(51) Int. Cl.
*G06F 16/25*    (2019.01)
*G06F 40/20*    (2020.01)

(52) U.S. Cl.
CPC ............ *G06F 16/254* (2019.01); *G06F 40/20* (2020.01)

(58) Field of Classification Search
CPC .................................................. G06F 16/254
See application file for complete search history.

(56) References Cited

U.S. PATENT DOCUMENTS

| | | | | |
|---|---|---|---|---|
| 10,733,240 B1* | 8/2020 | Callahan | ................ | G06Q 10/10 |
| 2002/0019759 A1 | 2/2002 | Arunapuram | | |
| 2005/0120039 A1* | 6/2005 | Amys | .................... | G06Q 10/10 |
| | | | | 707/999.102 |
| 2006/0020498 A1* | 1/2006 | Aitipamula | ............ | G06Q 10/08 |
| | | | | 705/28 |
| 2014/0153830 A1* | 6/2014 | Amtrup | ................ | G06V 30/416 |
| | | | | 382/190 |
| 2020/0265379 A1 | 8/2020 | Walker | | |
| 2020/0349510 A1 | 11/2020 | Dhonde | | |
| 2021/0368064 A1* | 11/2021 | Aggarwal | ............. | G06F 40/103 |
| 2022/0270042 A1* | 8/2022 | Cooper | .................. | G06Q 10/10 |

FOREIGN PATENT DOCUMENTS

EP    1225528 A2    7/2002

OTHER PUBLICATIONS

Alexandra Ortolani, "Improve Your Shipping Process for Your Small Businesses," Easyship.com, available at: "https://www.easyship.com/blog/shipping-process-steps", Mar. 11, 2022 (Year: 2022).*

* cited by examiner

*Primary Examiner* — Charles D Adams
(74) *Attorney, Agent, or Firm* — Caldwell Intellectual Property Law (57) ABSTRACT

An apparatus and corresponding methods for transforming a data structure is provided. Apparatus may include a processor and a memory communicatively connected to the processor. The memory instructs the processor to receive a plurality of discrete data structures from one or more transportation entities, wherein each of the plurality of discrete data structures comprises a plurality of discrete transport data related to a transport. The memory instructs the processor to generate a unified data structure as a function of the plurality of discrete data structures, wherein the unified data structure comprises unified transport data. The memory instructs the processor to display the unified data structure to a user through a graphical user interface (GUI).

16 Claims, 4 Drawing Sheets

APPARATUS AND METHOD FOR TRANSFORMING DATA STRUCTURES

FIELD OF THE INVENTION

The present invention generally relates to the field of data management. In particular, the present invention is directed to an apparatus and methods for transforming data structures.

BACKGROUND

Monitoring outgoing invoices and incoming payments for transportation can be tedious and confusing for all parties involved. Often when a deviation in a transport plan occurs, it can be difficult to track the subsequent alterations in billing and when one or more portions of a bill have been properly paid.

SUMMARY OF THE DISCLOSURE

In an aspect, an apparatus for transforming data structures is provided. Apparatus includes at least a processor and a memory communicatively connected to the at least a processer. The memory contains instructions configuring the at least a processor to receive a plurality of discrete data structures from one or more transportation entities, wherein each of the plurality of discrete data structures comprises a plurality of discrete transport data related to a transport, generate a unified data structure as a function of the plurality of the plurality of discrete data structures, wherein the unified data structure comprises unified transport data, and display the unified data structure to a user through a graphical user interface (GUI).

In another aspect, a method for transforming a data structure is provided. The method includes receiving, by a processor, a plurality of discrete data structures from one or more transportation entities, wherein each of the plurality of discrete data structures comprises a plurality of discrete transport data related to a transport, generating, by the processor, a unified data structure as a function of the plurality of discrete data structures, wherein the unified data structure comprises unified transport data, and displaying, by the processor, the unified data structure to a user through a graphical user interface (GUI).

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for transforming data structures. In an embodiment, this disclosure can be used to receive transport data related to one or more transports in the form of one or more discrete data structures. In one or more embodiments, a plurality of discrete data structures may be aggregated to generate a unified data structure. Aggregation of the plurality of discrete data structures may include combining information from each discrete data structure. In one or more embodiments, aggregation of the plurality of discrete data structures may include converting a format of one or more discrete data structures. In one or more embodiments, transport data may include information related to a bill or payment of a portion or total of a transport, such as, for example, a bill of lading of a transport. In some embodiments, aspects of the present disclosure allow for generating a comprehensive bill related to a transport. Comprehensive bill may include unpaid and/or paid portions and/or stages of transport. Exemplary embodiments illustrating aspects of the present disclosure are described below in the context of several specific examples.

Figure 1:
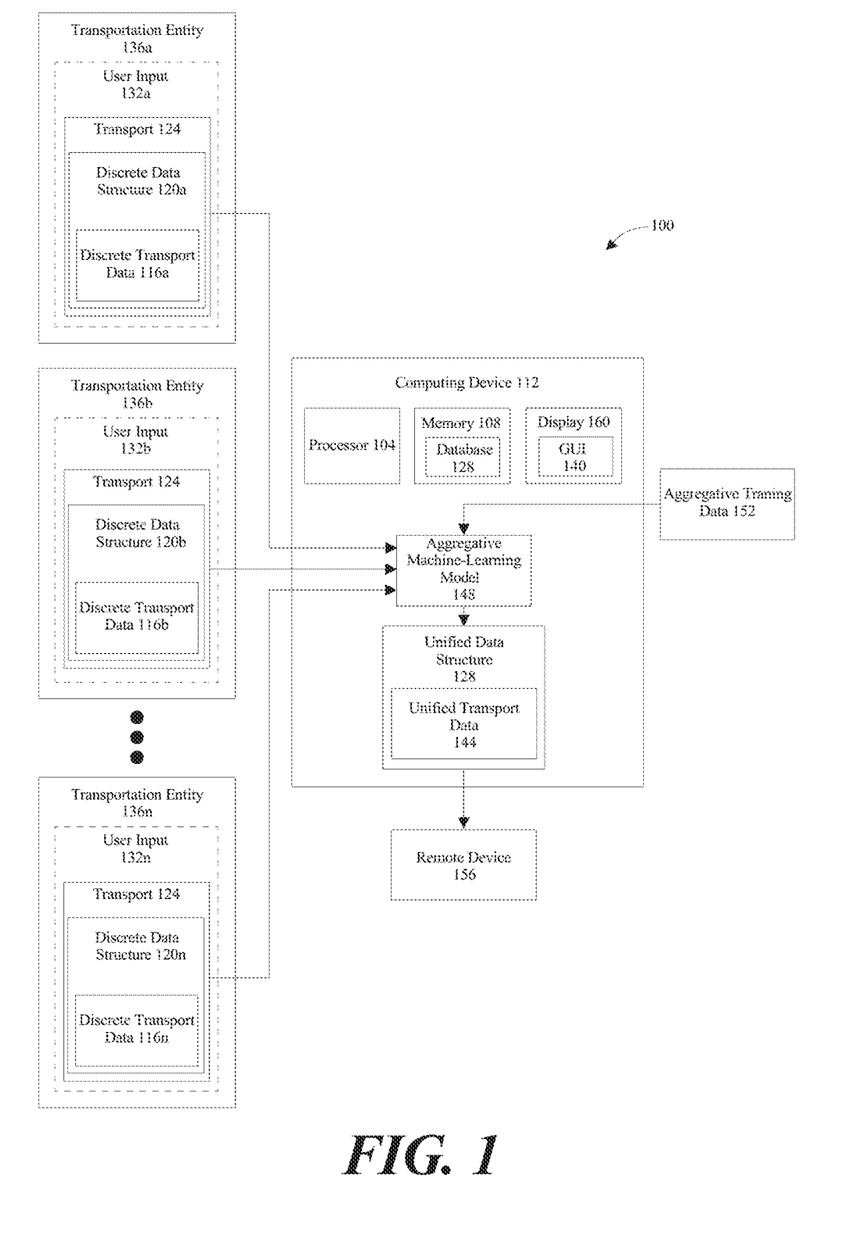
FIG. 1 is a block diagram illustrating an exemplary embodiment of an apparatus for transforming data structures in accordance with one or more embodiments of the present disclosure.

Referring now to FIG. 1, an exemplary embodiment of apparatus 100 for transforming a data structure is illustrated. Apparatus 100 includes a computing device 112. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 112 may include but is not limited to, for example, a computing device or cluster of computing devices in a first location and a second computing device or cluster of computing devices in a second location. Computing device 112 may include one or more computing devices dedicated to data storage, security, distribution of traffic for load balancing, and the like. Computing device 112 may distribute one or more computing tasks as described below across a plurality of computing devices of computing device, which may operate in parallel, in series, redundantly, or in any other manner used for distribution of tasks or memory between computing devices. Computing device 112 may be implemented using a "shared nothing" architecture in which data is cached at the worker, in an embodiment, this may enable scalability of apparatus 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 112 may include at least a processor 104 and a memory 108 communicatively connected to the at least a processor 104. Memory 108 may include instructions configuring processor 104 to perform and/or execute various steps and/or processes described in this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, memory 108 may include instructions configuring processor to receive a plurality of discrete data structures 120 associated with one or more transports, such as, for example, transport 124. In one or more embodiments, plurality of discrete data structures 120 may include discrete data structures 120a-n. In one or more embodiments, each discrete data structure 120a-n may include information related to one transport. For instance, and without limitation, discrete data structures 120a-n may each include information related to transport 124 and/or a portion thereof. In other embodiments, each discrete data structure 120a-n may include information related to different, respective transports. As used in this disclosure, a "discrete data structure" is information related to one or more transports that is organized in a specific type of file format. Thus, discrete data structure may include a formatted file. In some embodiments, types of file format may include a video format, audio format, textual format, handwritten, and the like. In various other embodiments, types of file formats of discrete data structure 120a-n may include .doc, .csv, .xml, .xlsx, .mp4, and the like. For example, and without limitations, a file format may include a chart containing information related to transport. File formats may also include stylistic characteristics, such as a header, footer, body style, font type, font size, font color, numbering, spacing, margins, and the like. In one or more embodiments, computing device 112 may include a display which may implement a graphical user interface (GUI) 140 to show discrete data structures 120 or other information discussed in this disclosure. Display 160 may include, without limitation, a screen that is in communication with computing device 112. In some embodiments, display 160 may be integrated into computing device 112. In other embodiments, display 160 may be a separate component from computing device 112. Display 160 may include any display as described in the entirety of this disclosure, such as, for example, a light emitting diode (LED) screen, liquid crystal display (LCD), organic LED, cathode ray tube (CRT), touch screen, any combination thereof, and the like. Computing device 112 may be configured to show any information inputted or outputted by processor 104 using graphical user interface 140. In an embodiment, and without limitation, a user may navigate GUI 140 by selecting an icon, swiping through a screen, entering a textual string of data, selecting a text box, verbally inputting and/or confirming data, and the like. For example, and without limitation, receiving discrete data structures 120a-n from one or more transportation entities 136a-n may include a user selecting a text box of a GUI labeled "Transport Information Request".

Still referring to FIG. 1, discrete data structures 120 may include discrete transport data 116 associated with transport

124. Discrete transport data 116 may include a plurality of discrete transport data, such a discrete transport data 116*a-n*. which are related to discrete data structures 120*a-n*, respectively. For the purposes of this disclosure, "discrete transport data" is information pertaining to one or more characteristics of one or more transports and/or portions thereof. For example, and without limitation, discrete transport data may include an outstanding amount due for the transportation of cargo from a first location to a second location during transport. In various embodiments, discrete transport data 116 may be received from a carrier device of a transportation entity, such as, for example, a smartphone, tablet, laptop, desktop, any other computing device, and the like. For instance, and without limitation, discrete transport data 116*a-n* may be received from a computing device of one or more transportation entities 136*a-n*, respectively. Still referring to FIG. 1, discrete transport data 116*a-n* may include, without limitation, characteristics of one or more transports, such as transport 124. For example, and without limitation, transport data 116 may include origins, destinations, geographical data, estimated delivery times, estimated costs, payment amounts, cargo description, cargo quantity (e.g., unit quantity data), and the like. In various embodiments, geographical data may include, without limitation, GPS coordinates, altitude, longitude, latitude, and the like. In some embodiments, geographical data may include relative location data. "Relative location data", as used in this disclosure, is information pertaining to a particular geographical point. Relative location data may include, for instance and without limitation, distances between two or more geographical points, closest points of interest, and the like.

Still referring to FIG. 1, a "transport", for the purposes of this disclosure, is a movement of one or more objects between two or more locations. In one or more embodiments, a transport, such as transport 124, includes a transportation of objects, such as cargo. For instance, and without limitation, a transport may include a shipment of cargo, which may include one or more moveable goods. In one or more embodiments, transport 124 includes one or more processes of moving cargo, such as from one location to another location using a transport vehicle. For instance, and without limitation, transport may include one or more processes of moving cargo from a first location (e.g., origin) to a second location (e.g., destination). Transport may include one or more portions and/or processes, such as, for example, one or more stages or actions. For instance, and without limitation, a stage of transport may include lading. In another instance, and without limitation, a stage of transport may include moving cargo from a first location to a second location using a first transport vehicle by a first transportation entity. In another instance, and without limitation, a stage of transport may include moving cargo from second location to a third location by a second transport vehicle by the first transportation entity or a second transportation entity. Transports, such as transport 124, may include, without limitation, transport vehicles, transport components, transport characteristics, and the like. Therefore, discrete transport data may include, without limitation, transport vehicle data, transport component data, transport characteristic data, and the like. "Transport component data", as used throughout this disclosure, is information pertaining to objects of a transport. Transport components may include cargo and/or moveable goods or items. Transport components may include, without limitation, construction materials, electronics, perishables, food, consumer goods, clothes, industrial equipment, parcels, freight shipments, and the like. In one or more embodiments, discrete transport data 116*a-n* may include transport component data. Transport component data may include, without limitation, dimensions such as height, width, length, volume, and the like. Transport component data may include, without limitation, values of components, costs associated with transporting components, quantity of components being transported, and the like. For instance, and without limitation, transport component data of discrete transport data 116*a-n* may include a value of $510.27 for a package of apples in bulk. In various embodiments, discrete transport data 116*a-n* and/or transport component data may further include unit quantity data, unit detail data or bound data. A "unit quantity datum" as used in this disclosure, is a quantity of an item of a plurality of items included in a transport or lading request. A unit quantity datum, in an embodiment, may include any numeric value. For example, and without limitation, the unit quantity datum may include a quantity of "5", "25", "125" and the like. Persons of ordinary skill in the art, upon reviewing the entirety of this disclosure, will be aware of various numeric values that may be used as the unit quantity datum consistently with this disclosure. In one or more embodiments, discrete transport data 116*a-n* may include unit detail data. A "unit detail datum," as used in this disclosure, is a textual identifier, which may include any form of textual data as described above, detailing a description of each item of the plurality of items included in a transport or corresponding lading request. In an embodiment, without limitation, a unit detail datum may include a technical name of an item, a use of an item, a size of the item, a functional location of the item, advertising name for an item, any combination thereof, or the like. For example, and without limitation, a unit detail datum may include brief descriptions, such as "Bracket, Cab Support", "Bracket, Front Right Bulkhead", "Angle, Platform", "Flange", "323E Track—Z-Lug", "42 in. Mower Blade", to name a few. In an embodiment, a number of unit detail datums included within each lading request may be correlated directly to the number of the unit identifier datums. Persons skilled in the art, upon reviewing the entirety of this disclosure, will be aware of various examples of descriptions of items that may be used as unit detail datums consistently with this disclosure.

Still referring to FIG. 1, in some embodiments, discrete transport data and/or transport component data may include one or more transport component statuses. A "transport component status", as used in this disclosure, is a condition of a transport component. A transport component status may include, without limitation, hazardous material, frangible, damaged, and/or other conditions. In some embodiments, discrete transport data 116*a-n* may include one or more transport characteristic data related to transport characteristics. A "transport characteristic", as used in this disclosure, is an attribute relating to a method or process of transport. A transport characteristic may include a method or type of shipment of transport, such as and without limitation, expedited, overnight, freight, parcel, international, domestic, land, sea, air, and the like. In other embodiments, a transport characteristic may include a stage of transport and associated costs of each stage, such as, for example, lading, in transit, out for delivery, delivered, rerouting, transport vehicle transfer, customs, in warehouse, transport request received, and the like. In some embodiments, apparatus 100 may use a transport characteristic classifier to classify one or more transports to one or more transport characteristic categories. A transport characteristic classifier may be trained with training data correlating discrete transport data to transport characteristic groupings, such as, without limitation, freight, expedited, hazardous, parcel, international, domestic, land, sea, air, overnight, and the like. Training data may be received from an external computing device, user input, and/or previous iterations of processing. Transport characteristic classifier may be configured to input discrete transport data 116 and categorize transport 124 and/or transport components of transport 124 to one or more characteristics groupings. In one or more embodiments, discrete transport data 116*a-n* may include bound data. A "bound datum" as used in this disclosure, is a date by which each transport is to arrive at the final destination of the transport. A date of a bound datum may be arranged in any format utilized for communicating the date. For example, and without limitation, a bound datum for a delivery date of Jan. 8, 2020 may include, "01/08/2020", "Jan. 8, 2020", "2020-01-08", "08012020", "01082020", "Jan082020", any combination thereof, or the like. Persons skilled in the art, upon reviewing the entirety of this disclosure, will be aware of various examples of date formats that may be used for a bound datum consistently with this disclosure. In various embodiments, discrete transport data 116*a-n* may include terminus data. A "terminus datum", as used in this disclosure, is a final destination of a transport. In one or more embodiments, a final destination may include details of a physical location, such as an address, coordinates, a unique identifier correlating to a physical location, or the like. For example, and without limitation, a final destination may include "Magnus Warehousing 1301 39$^{th}$ Street N. Fargo, North Dakota 58102." Persons skilled in the art, upon reviewing the entirety of this disclosure, will be aware of various examples of physical locations that may be used as the associated terminus datum consistently with this disclosure.

Still referring to FIG. 1, discrete transport data 116*a-n* may be received from one or more transportation entities 136, such as exemplary transportation entities 136*a-n*. For instance, and without limitation, processor 104 may be configured to receive a plurality of discrete transport data 116*a-n* from a plurality of transportation entities 136*a-n*, respectively. In one or more embodiments, plurality of discrete transport data 116*a-n* may include information related to various portions or characteristics of transport 124, as previously mentioned in this disclosure. In nonlimiting embodiments, a plurality of transportation entities 136 may include any number of transportation entities, such as, for example, a first transportation entity 136*a*, a second transportation entity 136*b*, up to an "nth" transportation entity, such as transportation entity 136*n*. In one or more embodiments, processor 104 may receive first discrete transport data 116*a* from first transportation entity 136*a*, second discrete transport data 116*b*, from second transportation entity 136*b*, up to a discrete transport data 116*n* from transportation entity 136*n*. In other nonlimiting embodiments, processor 104 may receive a plurality of discrete transport data 116 from a single transportation entity, such as transportation entity 136*a*. In other embodiments, processor 104 may receive plurality of direct transport data 116 from a plurality of transportation entities. A "transportation entity", as used in this disclosure, is an individual and/or organization involved in a transport. Transportation entity 136 may conduct and/or execute a transport. Transportation entity 136 may include, but is not limited to, recipients, carriers, warehouses, transport vehicle operators, computer servers, and the like. Apparatus 100 may communicate with one or more computing devices of transportation entity 136. In one or more embodiments, transportation entity may use a transport vehicle to complete one or more portions of a transport. For the purpose of this disclosure, "transport vehicles", as used in this disclosure, are devices configured to provide locomotive capabilities. Transport vehicles may include, without limitation, cars, trucks, motorcycles, boats, planes, drones, bicycles, freight carrier, any other mobile structure, and the like. Transport vehicle may be configured to operate through, but is not limited to, air, land, sea, and the like. A transport vehicle may be configured to engage in one or more portions, or steps, of a transport. For the purposes of this disclosure, a "portion" of a transport is a step or process of a transport. For instance, and without limitation, a portion of transport may include a current stage of transport, as described previously in this disclosure. In some embodiments, transport vehicle may engage in pickup, delivery, and/or line haul operations. In some embodiments, a transport vehicle may include, but is not limited to, Less than Truckload ("LTL") and/or Full Truckload ("FTL") freight delivery. In various embodiments, transport vehicle may be controlled and/or operated by an operator. An "operator," for the purposes of this disclosure, is a person that uses a transport vehicle. As previously mentioned, transport vehicle may be used to transport objects, or items, from one location to another, where objects may include, as nonlimiting examples, cargo, goods, produces, livestock, non-fungible goods, fungible goods, produce, cargo containers, oil, liquids, gasoline, food, meals, people, and the like.

Still referring to FIG. 1, in some embodiments, discrete transport data 116*a-n* may be received from one or more sensors, which may be attached and/or in communication with a device and/or transport vehicle of transportation entity 136*a-n*. In some embodiments, discrete transport data 116*a-n* may be received from a user input 132*a-n* through a remote device 156 of a transportation entity 136*a-n* and/or through graphical user interface (GUI) 140 of computing device 112, as previously mentioned in this disclosure. For the purposes of this disclosure, a "remote device" is a device independent of computing device. Remote device may be located remotely to computing device 112. In some embodiments, apparatus 100 may receive discrete transport data 116*a-n* from one or more external and/or remote computing devices, such as without limitation servers, desktops, smartphones, tablets, and the like. "User input", as used in this disclosure, is a form of data entry received from an individual and/or group of individuals. User input 132*a-n* may include, but is not limited to, text input, engagement with icons of a graphical user interface, and the like. Text input may include, without limitation, entry of characters, words, strings, symbols, and the like. In some embodiments, user input 132*a-n* may include one or more interactions with one or more elements of a graphical user interface (GUI), such as GUI 140. A "graphical user interface" as used in this disclosure is an interface including set of one or more pictorial and/or graphical icons corresponding to one or more computer actions. GUI 140 may be configured to receive user input 132*a-n*. In various embodiments, computer icons may represent transport data. For example, and without limitation, a band having a moveable indicator may represent progress of a transportation vehicle along a specific route. In other various embodiments, GUI 140 may include entry fields, such as text boxes, where textual data of discrete transport data 116*a-n* may be inputted into the text boxes via user input 132*a-n*. In one or more embodiments, GUI 140 include one or more icons, where each icon represents a program configured to perform logical operations, such as opening windows, generating files, communicating with external device, and the like. In various embodiments, GUI 140 may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance, and without limitation, an event handler may be programmed to generate a pop-up window if a user double clicks on a specific icon. User input 132a-n may include, a manipulation of computer icons, such as, but not limited to, clicking, selecting, dragging and dropping, scrolling, and the like. In some embodiments, user input 132a-n may include an entry of characters and/or symbols in a user input field. A "user input field" as used in this disclosure is a portion of graphical user interface configured to receive data from an individual. A user input field may include, but is not limited to, text boxes, search fields, filtering fields, and the like. In some embodiments, user input 132a-n may include touch input. Touch input may include, but is not limited to, single taps, double taps, triple taps, long presses, swiping gestures, and the like. In some embodiments, GUI 140 may be displayed on, without limitation, monitors, smartphones, tablets, vehicle displays, and the like. Vehicle displays may include, without limitation, monitors and/or systems in a vehicle such as multimedia centers, digital cockpits, entertainment systems, and the like. One of ordinary skill in the art upon reading this disclosure will appreciate the various ways a user may interact with graphical user interface.

Still referring to FIG. 1, discrete transport data 116a-n may include one or more unique identifiers and/or be assigned one or more unique identifiers generated through apparatus 100, such as through processor 104. A unique identifier may include any combination of alpha and/or numerical values, where there may be any total of values included in the unique identifier. Each unique identifier may be associated with a transport component, group of transport components, and/or transports. For example, and without limitation, a unique identifier may include a combination of seven alpha and/or numeric values, such as "N303363", "K994002", "F110482", "AKK13257", and the like. In an embodiment, there is no limitation to the number of unit identifiers included in each communication of the plurality of communication. Persons skilled in the art, upon reviewing the entirety of this disclosure, will be aware of various examples of unique identifiers that may be used as the unit identifier datum consistently with this disclosure.

Still referring to FIG. 1, receiving discrete data structures 120 may include storing discrete transport data of discrete data structures in an internal memory, such a memory 108. In one or more embodiments, memory 108 may include one or more databases. In an embodiment, and without limitation, internal database may be configured to identify an origination datum, wherein an origination datum is an element of data representing one or more geographical locations and/or origination locations of a unit and/or article. In one or more embodiments, memory 108 may be configured to determine a progression vector as a function of the origination datum and terminus datum, wherein a progression vector is a data structure that represents one or more quantitative values and/or measures progression. In an embodiment, progression vector may be determined as a function of origination datum and terminus datum using a classifier, wherein a classifier is described below in reference to FIG. 2. In an embodiment, and without limitation, updating memory 108 may further comprise receiving an input from an internal database, wherein an internal database. In an embodiment, and without limitation, updating internal memory may include receiving an input of an available communication from internal database as a function of a ready datum. A "ready datum" as used in this disclosure, is a datum describing a date a client plans to execute lading request. For example, and without limitation, ready datum may denote a manually entered date. In another embodiment, ready datum may denote a date as a function of a user selecting a date from a calendar display, selecting a date from a drop-down menu, and the like. For example, and without limitation, ready datum may include the selected date of "31" on a calendar display of the month of July in the year 2020.

Still referring to FIG. 1, memory 108 contains instructions further configuring processor 104 to generate a unified data structure as 128 a function of the discrete data structures. For the purposes of this disclosure, a "unified data structure" is a formatted file containing consolidated information related to a transport. Formatting of a file, or data of the file, may include styles, fonts, arrangement, organization, file type, and the like. For instance, and without limitation, unified data structure may include combined data from one or more of the discrete data structures that is arranged into a matrix or table. In another instance, and without limitation, unified data structure may include combined data from one or more of the discrete data structures that is organized alphabetically or chronologically. In another instance, and without limitation, unified data structure may include combined data from one or more discrete data structures that converts various file types (e.g. .docx, .xlsx, .pdf, and the like) into another or one file type. For example, and without limitation, discrete data structures may include file types, such as, for example, a .pdf, a .docx, and a .xlsx, and creating a unified data structure having only a, for example and without limitation, a .pdf type file. In one or more embodiments, generating unified data structure may include aggregating and/or combining discrete data structures. Aggregating discrete data structures to create unified data structure may include combining transport data from one or more transportation entities 136a-n, which may include carriers, warehouse management systems, shippers, and the like. In various embodiments, aggregation may include transforming a first discrete data structure into a second discrete data structure. For example, and without limitation, aggregation may include transforming a first discrete data structure with a format type of .jpg into a second discrete data structure with a format type of an editable .pdf. In another example, and without limitation, aggregation may include combining first discrete transport data set of a first discrete data structure and second discrete transport data set of a second discrete data structure into a reformatted unified data structure, where first and second discrete transport data may be organized and/or categorized within unified data structure. For example, and without limitation, in one or more embodiments, generating unified data structure may include identifying one or more bits of transport data, such as discrete transport data 116a-n, as discussed further below in regard to language processing and reading of various formats.

Still referring to FIG. 1, processor 104 may be configured to search each discrete data structure and compare discrete transport data to ensure information is not duplicated when combined into unified transport data 144 of unified data structure 128. For the purposes of this disclosure, "unified transport data" is data that is a result of combining a plurality of discrete transport data of a plurality of discrete data structures. Therefore, if processor 104 finds information from one or more discrete transport data 116*a-n* are identical, then processor 104 may be configured to combine the plurality of identical transport data into one piece of information of unified transport data 144. In one or more embodiments, processor 104 may be configured to identify duplicate information by parsing through each unified transport data structure. In other embodiments, processor 104 may be configured to categorize discrete transport data, such as into categories related to stages of transport 124.

In one or more embodiments, unified data structure 128 may be generated using an aggregative machine-learning model. As used in this disclosure, an "aggregative machine-learning model" is a machine-learning model to combine discrete data structures. For instance, and without limitation, aggregative machine-learning model may combine a format and/or content of a plurality of discrete data structures from one or more transportation entities. For example, and without limitation, discrete data structures may include file formats including .doc, .pdf, .mp4, and the like, and aggregative machine-learning model 148 may combine discrete data structures so that a corresponding unified data structure only includes a .pdf formatted file. In another exemplary embodiments, each discrete data structure may include transport data, and aggregative machine-learning model 148 may combine transport data of discrete data structures. A "machine-learning model," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Aggregative machine-learning model may include one or more route machine-learning processes such as supervised, unsupervised, or reinforcement machine-learning processes that computing device 112 may or may not use in the generation of unified data structure. An aggregative machine-learning process may include, without limitation, machine-learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, an aggregative machine-learning module 148 may train aggregative machine-learning model as a function of an aggregative training set 152. As used in this disclosure "aggregative training data" is a training data set that correlates discrete data structures to a unified data structure. For instance, and without limitation, aggregative training data 152 may include discrete inputs related to discrete data structures and corresponding unified outputs that are related to unified data structures. Using aggregative training data 152, aggregative machine-learning module 148 may create and/or generate an aggregative machine-learning model, which is described further in FIG. 2. Aggregative machine-learning model may then be configured to receive discrete data structures, and corresponding discrete transport data, and generate unified data structure, and corresponding unified transport data. For instance, and without limitation, generating unified data structure 128 may include providing an aggregative-machine learning module, receiving, by the aggregative machine-learning module, aggregative training data, wherein aggregative training data comprises discrete inputs and corresponding unified outputs, creating, by the aggregative machine-learning module, an aggregative machine-learning model, receiving, by the machine-learning model, the plurality of discrete data structures, and generating, by the machine-learning model, the unified data structure. For example, and without limitation, a plurality of discrete data structures may include discrete transport data, such as discrete transport data describing a transport moving a unit of goods from New York to Maine, which was requested by a client. Discrete transport data may include information related to an agreement between the client and one or more transportation entities to transfer the unit over six days by a first conveyor (e.g., first transportation entity 136*a*) for $82.00, and $103.00 to transfer the unit over two days by a second conveyor (e.g., second transportation entity 136*b*) using a specific route. Discrete transport data may also include a progression of transport vehicle along the route. First discrete data of first transportation entity may include information related to the progression by stating when the portion of the transport is complete by the first transportation entity. Furthermore, discrete transport data may include information describing a payment by the client for $82.00, paying for the completion of the portion of the transport by the first transportation entity. Unified data structure may then be generated to include a bill for a due amount of $103.00. Unified data structures may also include unified transport data compiling and organizing the progression of the first and second transportation entities, the billed amounts associated with each, and any payments received from the client. Aggregative training set 152 may be received as a function of user-entered valuations of transport data, lading requests, and the like. Computing device 112 may receive aggregative training set 152 by receiving correlations of training data that was previously received and/or determined during a previous iteration of determining unified data structures having unified transport data, such as routes or stages of transport and/or costs associated with the routes or stages of the transport. In various embodiments, aggregative training set 152 may be received by one or more remote devices and/or user inputs that at least correlate a discrete data stricture with a unified data structure.

Still referring to FIG. 1, processor 104 of apparatus 100 may be configured to read various formats of discrete data structures 120*a-n*. For example, and without limitation, apparatus 100 may use optical character recognition or optical character reader (OCR) to automatically convert images of written (e.g., typed, handwritten, or printed text) into machine-encoded text. In some cases, recognition of at least a keyword from discrete data structure 120*a-n* may include one or more processes, including without limitation optical character recognition (OCR), optical word recognition, intelligent character recognition, intelligent word recognition, and the like. In some cases, OCR may recognize written text, one glyph, or character at a time. In some cases, optical word recognition may recognize written text, one word at a time, for example and without limitation, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes. In some cases, OCR may include an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of discrete data structure 120a-n. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to align text. In some cases, a de-speckle process may include removing positive and negative spots and/or smoothing edges. In some cases, a binarization process may include converting an image from color or greyscale to black-and-white (i.e. a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments, an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary nonlimiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary nonlimiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Still referring to FIG. 1, in some cases, OCR may include post-processing. For example, and without limitation, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. In some cases, an OCR process may make us of a priori knowledge of grammar for a language being recognized. For example, and without limitation, grammar rules may be used to help determine if a word is likely to be a verb or a noun. Distance conceptualization may be employed for recognition and classification. For example, and without limitation, a Levenshtein distance algorithm may be used in OCR post-processing to further optimize results.

Still referring to FIG. 1, processor may include or be communicatively connected to a language processing module. In one or more embodiments, language processing module may compare extracted words to categories of unit identifier data recorded at computing device 112, one or more categories of terminus data recorded at computing device 112, one or more categories of unit quantity data recorded at computing device 112, one or more categories of unit detail data recorded at computing device 112, and/or one or more categories of bound data recorded at computing device 112; such data for comparison may be entered on computing device 112 as described above using data inputs or the like. In an embodiment, one or more categories may be enumerated, to find total count of mentions in such documents. Alternatively or additionally, language processing module may operate to produce a language processing model. Language processing model may include a program automatically generated by computing device 112 and/or language processing module to produce associations between one or more words extracted from at least a document and detect associations, including without limitation mathematical associations, between such words, and/or associations of extracted words with categories of unit identifier data, categories of associated terminus datum, categories of unit quantity data, categories of unit detail data, and/or categories of bound data. Associations between language elements, where language elements include for purposes herein extracted words, categories of unit identifier data, categories of associated terminus datum, categories of unit quantity data, categories of unit detail data, and/or categories of bound data may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given categories of unit identifier data, categories of associated terminus datum, categories of unit quantity data, categories of unit detail data, and/or categories of bound data. As a further example, statistical correlations and/or mathematical associations may include probabilistic formulas or relationships indicating a positive and/or negative association between at least an extracted word and/or a given categories of unit identifier data, categories of associated terminus datum, categories of unit quantity data, categories of unit detail data, and/or categories of bound data; positive or negative indication may include an indication that a given document is or is not indicating a categories of unit identifier data, categories of associated terminus datum, categories of unit quantity data, categories of unit detail data, and/or categories of bound data is or is not significant. For instance, and without limitation, a negative indication may be determined from a phrase such as "Mar. 34, 2020," whereas a positive indication may be determined from a phrase such as "Mar. 29, 2020," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 112, and/or the like.

Still referring to FIG. 1, language processing module, and/or computing device 112 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and/or computing device 112 may then use such associations to analyze words extracted from one or more documents and determine that the one or more documents indicate significance of a categories of unit identifier data, categories of associated terminus datum, categories of unit quantity data, categories of unit detail data, and/or categories of bound data. In an embodiment, computing device 112 may perform this analysis using a selected set of significant documents, such as documents identified by one or more experts as representing good science, good aviation analysis, good aviation standard, or the like; experts may identify or enter such documents via user device as described below, or may communicate identities of significant documents according to any other suitable method of electronic communication, or by providing such identity to other persons who may enter such identifications into computing device 112. Documents may be entered into computing device 112 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, computing device 112 may automatically obtain the document using such an identifier, for instance by submitting a request to a database or compendium of documents such as JSTOR as provided by Ithaka Harbors, Inc. of New York.

Still referring to FIG. 1, memory 108 may include instructions configuring processor 104 to identify an origination datum as a function of discrete transport data 116a-n. As used in this disclosure, an "origination datum" is an element of data representing one or more geographical locations and/or origination locations of a unit and/or article. For example, and without limitation, origination datum may include one or more streets, towns, cities, capitols, states, countries, and the like thereof. As a further nonlimiting example, origination datum may include one or more addresses, longitudes, latitudes, and/or geographical markers. In an embodiment, and without limitation, origination datum may include an address of a vendor and/or client. In one or more embodiments, processor 104 may be configured to determine a progression vector of unified transport data 144. As used in this disclosure, a "progression vector" is a data structure that represents one or more quantitative or qualitative measures of a progression or stages of a transport. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes. For example, and without limitation, progression vector may be a value of 30 denoting that an article and/or unit is nearing the terminus location. As a further non-limiting example, progression vector may be a value of 2 denoting that an article and/or unit is close to the origination location.

In an embodiment, and without limitation, a progression vector may be determined as a function of origination datum and terminus datum of discrete transport data 116a-n using a classifier, wherein terminus datum includes any of the terminus datum as described above in detail. As used in this disclosure a "classifier" is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 112 and/or another device may generate a classifier using a classification algorithm, defined as a processes whereby a computing device 112 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, the classifier may be configured to receive origination datum and/or terminus datum and output a progression vector. Classifier may be trained using progression training data. Progression training data may comprise inputs correlated to outputs; inputs may include a plurality of transport data. The plurality of transport data may include origination data and terminus data. The outputs may include a progression vectors and/or progression vector entries. Progression vector entries may include, as non-limiting examples, "in transit," "departed," "loading," "in warehouse," and the like. In some embodiments progression vector entries may include quantitative values, such as "80 miles," "2 days", and the like. These quantitative values may represent, for example, the distance to a destination or intermediate stop, the time remaining to the destination or intermediate stop, the time remaining until shipment, and the like.

Figure 2:
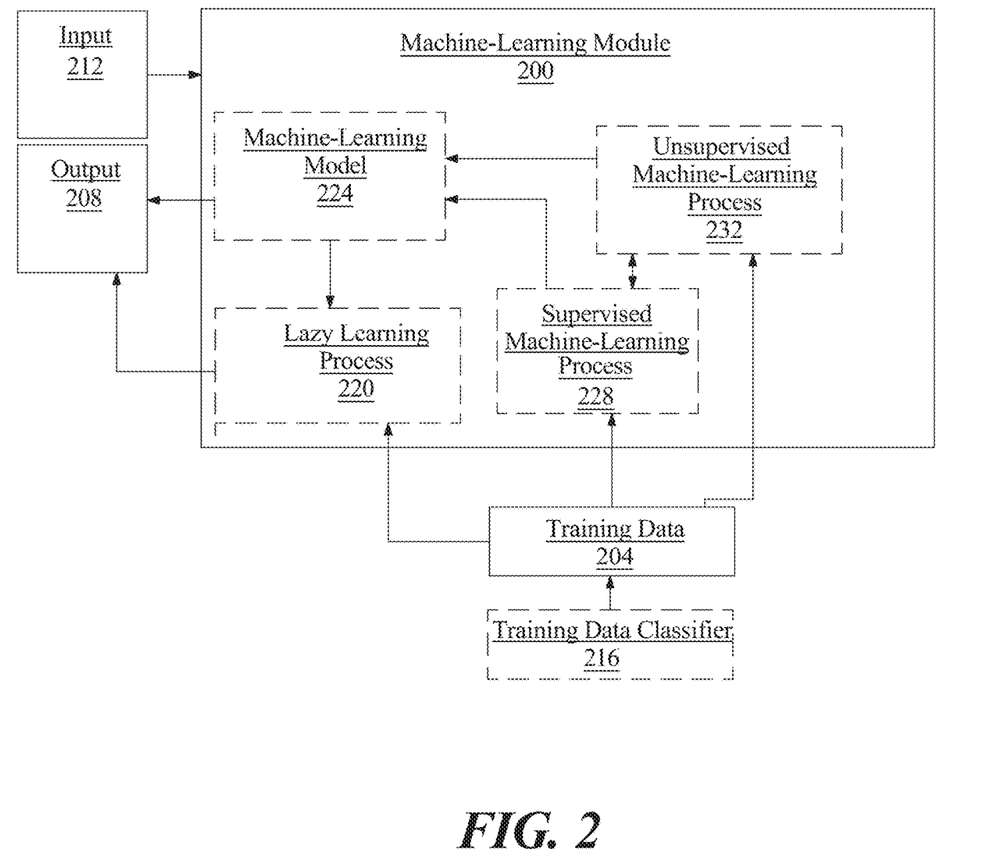
FIG. 2 is a block diagram of an exemplary embodiment of a machine-learning module in accordance with one or more embodiments of the present disclosure.

Still referring to FIG. 2, processor 104 may be configured to generate a classifier using a Naive Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A)P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 112 may then calculate a likelihood table by calculating probabilities of different data entries and classification labels. Computing device 112 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $\alpha_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Referring now to FIG. 2, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example an input of a spot signature and/or lading request may relate to a logical route.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to sub-categories of spot signatures such as precontracted agreements, client strategies, route preferences and the like thereof.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include spot signatures and/or lading requests as described above as inputs, logical routes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
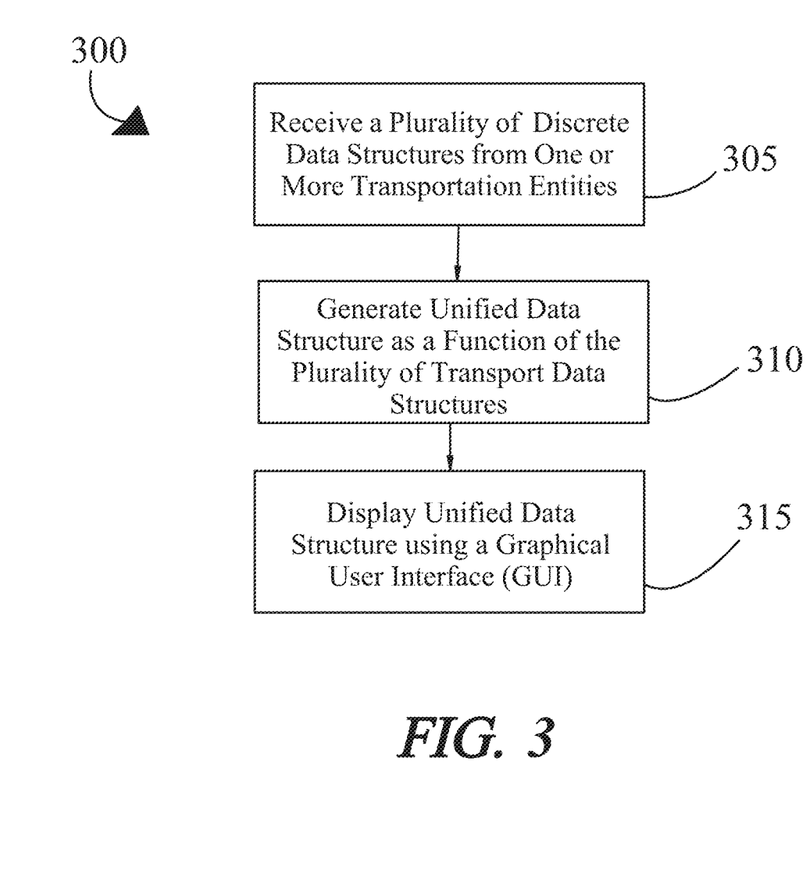
FIG. 3 is a flow diagram illustrating an exemplary embodiment of a method for transforming a data structure in accordance with one or more embodiments of the present disclosure.

Now referring to FIG. 3, an exemplary embodiment of a method for transforming data structures is illustrated. At step 305, method 300 includes receiving a plurality of discrete data structures 120a-n from one or more transportation entities 136a-n. In one or more embodiments, discrete data structures 120a-n may each include training data 116a-n, respectively. Discrete data structures include any of the discrete data structures as described above, in reference to FIGS. 1-2.

Still referring to FIG. 3, at step 310, method 300 includes generating unified data structure 128 as a function of the plurality of discrete data structures 120a-n. In one or more embodiments, unified data structure includes unified transport data 144, which may be generated as a function of discrete discrete transport data 116b. Unified data structure may include any unified data structure as described above in FIGS. 1-2.

Still referring to FIG. 3, at step 315, method 300 includes displaying unified data structure 128 to a user using a graphical user interface (GUI), such as GUI 140 or a GUI of a remote device, such as a remote client device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
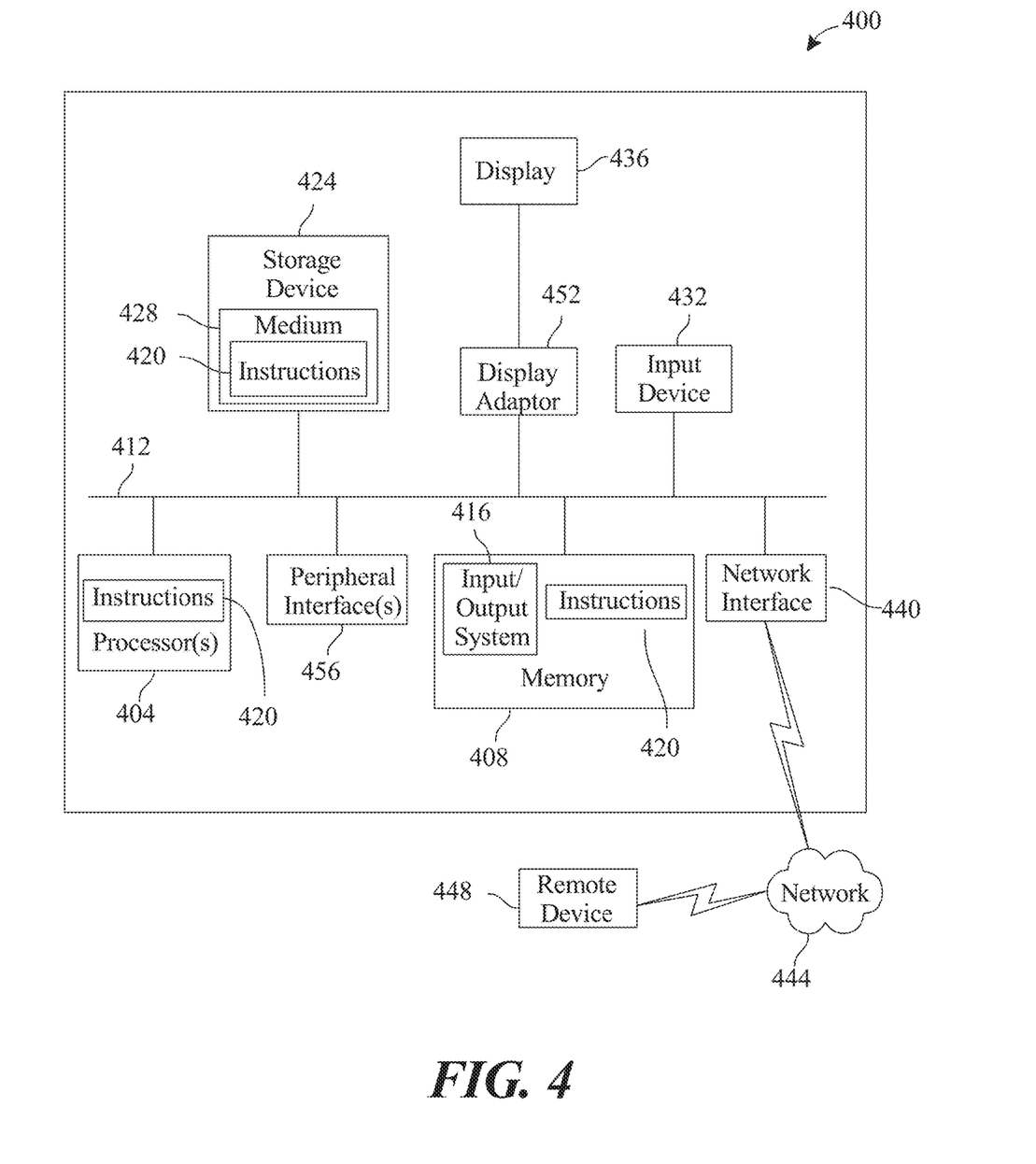
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. In one or more embodiments, display device 436 may include display 160 of FIG. 1. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a data structure, the apparatus comprising:
   at least a processor; and
   a memory communicatively connected to the at least a processor, the memory containing instructions configuring the at least a processor to:
   receive a plurality of discrete data structures from a user input of one or more transportation entities using a remote device, wherein each of the plurality of discrete data structures comprises a plurality of discrete transport data related to a transport, wherein the plurality of discrete transport data comprises one or more transport characteristics, wherein the one or more transport characteristics are classified as a function of the transport using a transport characteristic classifier, wherein the transport characteristic classifier is trained with training data correlating the plurality of discrete transport data to the one or more transport characteristics;
   generate a unified data structure as a function of the plurality of discrete data structures, wherein the unified data structure comprises unified transport data, wherein generating the unified data structure comprises:
      training an aggregative machine-learning model using aggregative training data, wherein the aggregative machine-learning model is configured to combine the plurality of discrete data structures, wherein the plurality of discrete data structures comprises the plurality of discrete transport data, wherein the plurality of discrete transport data comprises progression of a transport vehicle along a route, wherein aggregative training data comprises the plurality of discrete data structures as inputs correlated to the unified data structure as outputs, wherein training the aggregative machine-learning model comprises:
         iteratively updating the aggregative training data as a function of the input and output results of the aggregative machine-learning model; and
         retraining the aggregative machine-learning model with an updated aggregative training data; and
      generating the unified data structure as a function of the plurality of discrete data structures using the trained aggregative machine-learning model; and
   determine a progression vector as a function of the unified transport data, wherein the progression vector comprises a numerical value reflective of a progression of the transport between an origination location and a terminus location;
   display the unified data structure and the progression vector to a user through a graphical user interface (GUI).

2. The apparatus of claim 1, wherein each of the plurality of discrete data structures comprises an invoice of one or more portions of the transport.

3. The apparatus of claim 2, wherein the plurality of discrete transport data comprises one or more costs of one or more portions of the transport, respectively.

4. The apparatus of claim 3, wherein the plurality of discrete transport data comprises one or more payments for the one or more costs.

5. The apparatus of claim 1, wherein the plurality of discrete data structures comprises a plurality of file formats and the unified data structure comprises a single file format.

6. The apparatus of claim 1, wherein generating the unified data structure comprises consolidating the plurality of transport data.

7. The apparatus of claim 1, wherein the memory contains instructions further configuring the at least a processor to convert, using optical character recognition (OCR), images of written text of the plurality of discrete transport data into machine-encoded text.

8. The apparatus of claim 1, wherein the at least a processor is further configured to generate a language processing model, wherein the language processing model comprises a natural language processing classification algorithm configured to enumerate one or more statistical relationships between a discrete transport data input and a unified transport data output.

9. A method for generating a data structure, the method comprising:
- receiving, by a processor, a plurality of discrete data structures from a user input of one or more transportation entities using a remote device, wherein each of the plurality of discrete data structures comprises a plurality of discrete transport data related to a transport, wherein the plurality of discrete transport data comprises one or more transport characteristics, wherein the one or more transport characteristics are classified as a function of the transport using a transport characteristic classifier, wherein the transport characteristic classifier is trained with training data correlating the plurality of discrete transport data to the one or more transport characteristics;
- generating, by the processor, a unified data structure as a function of the plurality of discrete data structures, wherein the unified data structure comprises unified transport data, wherein generating the unified data structure comprises:
  - training an aggregative machine-learning model using aggregative training data, wherein the aggregative machine-learning model is configured to combine the plurality of discrete data structures, wherein the plurality of discrete data structures comprises the plurality of discrete transport data, wherein the plurality of discrete transport data comprises progression of a transport vehicle along a route, wherein aggregative training data comprises the plurality of discrete data structures as inputs correlated to the unified data structure as outputs, wherein training the aggregative machine-learning model comprises:
    - iteratively updating the aggregative training data as a function of the input and output results of the aggregative machine-learning model; and
    - retraining the aggregative machine-learning model with an updated aggregative training data; and
  - generating the unified data structure as a function of the plurality of discrete data structures using the trained aggregative machine-learning model; and
- determining, by the processor, a progression vector as a function of the unified transport data, wherein the progression vector comprises a numerical value reflective of a progression of the transport between an origination location and a terminus location;
- displaying, by the processor, the unified data structure and the progression vector to a user through a graphical user interface (GUI).

10. The method of claim 9, wherein each of the plurality of discrete data structures comprises an invoice of one or more portions of the transport.

11. The method of claim 10, wherein the plurality of discrete transport data comprises one or more costs of one or more portions of the transport, respectively.

12. The method of claim 11, wherein the plurality of discrete transport data comprises one or more payments for the one or more costs.

13. The method of claim 9, wherein the plurality of discrete data structures comprises a plurality of file formats and the unified data structure comprises a single file format.

14. The method of claim 9, wherein generating the unified data structure comprises consolidating the plurality of transport data.

15. The method of claim 9, further comprising converting, using optical character recognition (OCR), images of written text of the plurality of discrete transport data into machine-encoded text.

16. The method of claim 9, further comprising generating a language processing model, wherein the language processing model comprises a natural language processing classification algorithm configured to enumerate one or more statistical relationships between a discrete transport data input and a unified transport data output.

* * * * *